Oct. 26, 1943.   W. R. TUCKER   2,333,059
TWO COLOR INJECTION DIE
Filed Jan. 8, 1941   4 Sheets-Sheet 1
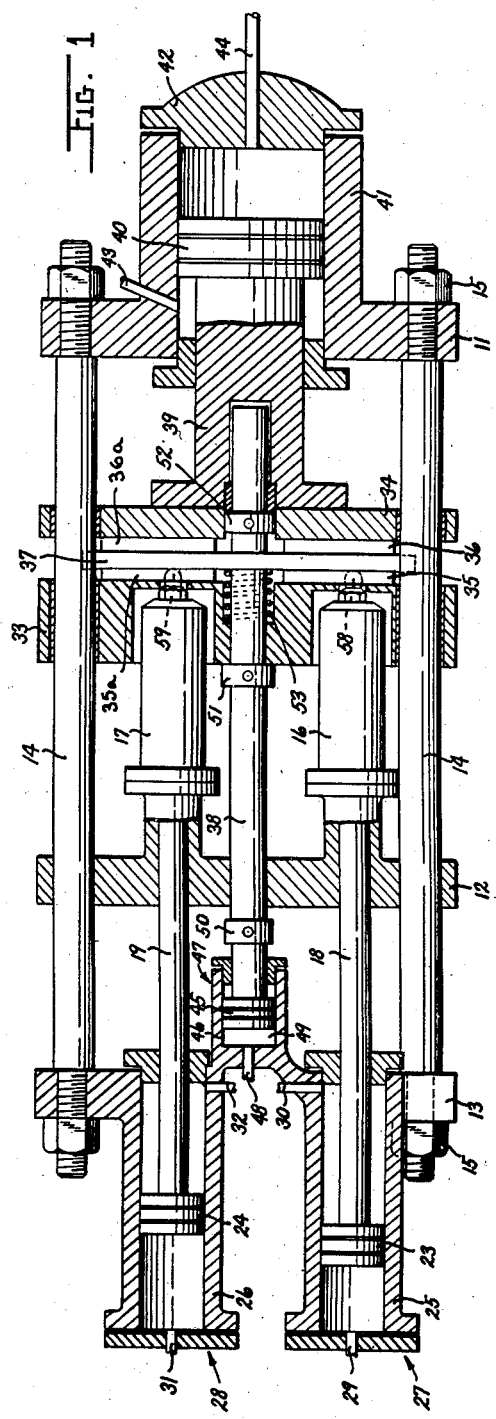
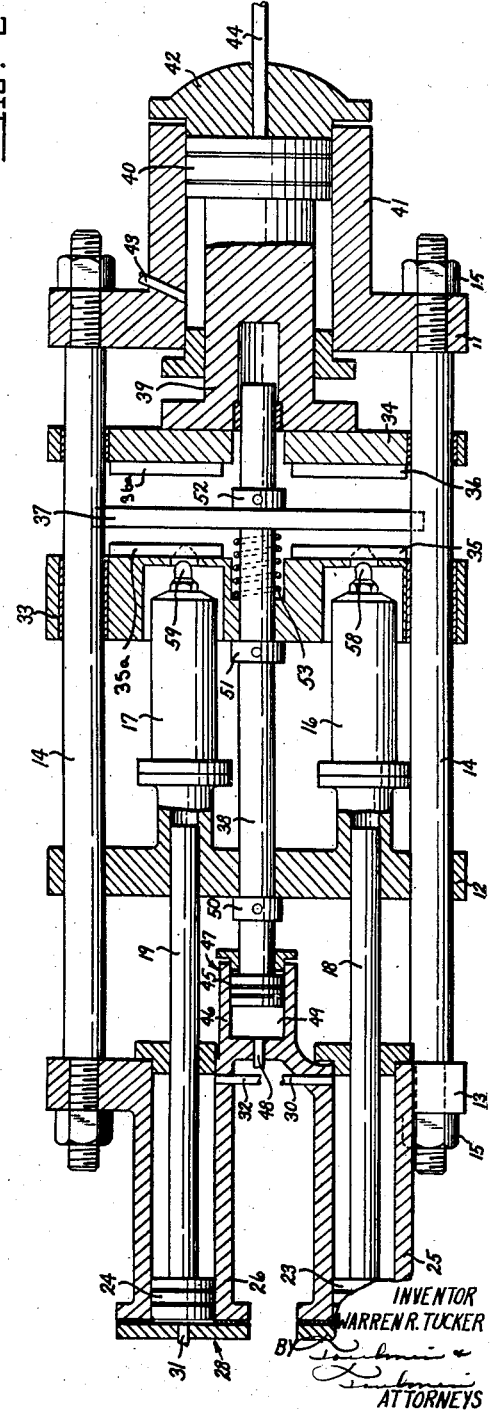
INVENTOR
WARREN R. TUCKER
BY
ATTORNEYS

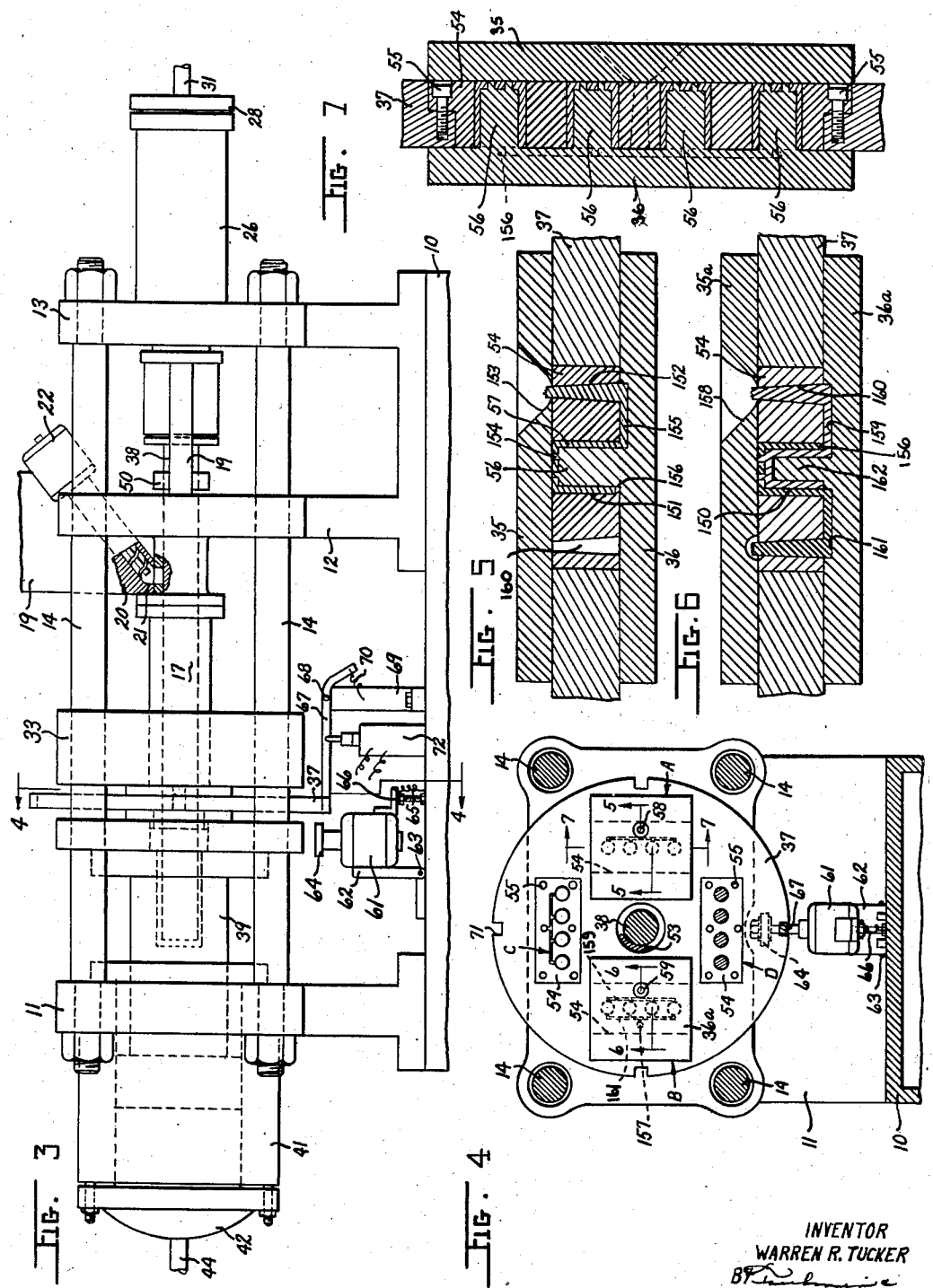

Oct. 26, 1943.  W. R. TUCKER  2,333,059
TWO COLOR INJECTION DIE
Filed Jan. 8, 1941  4 Sheets-Sheet 3
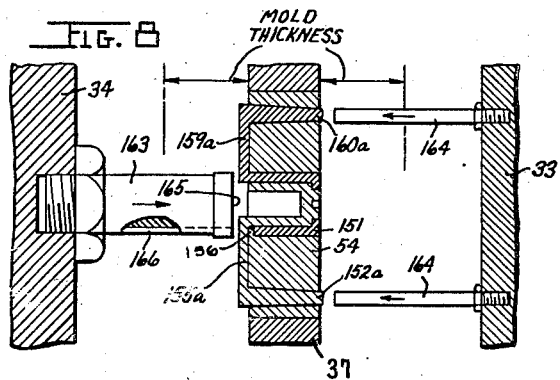
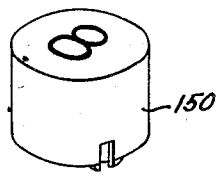
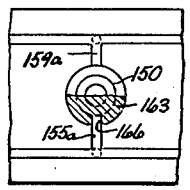
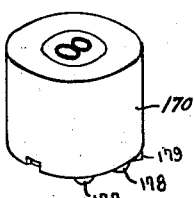
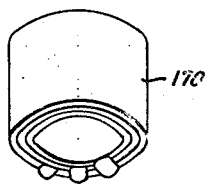
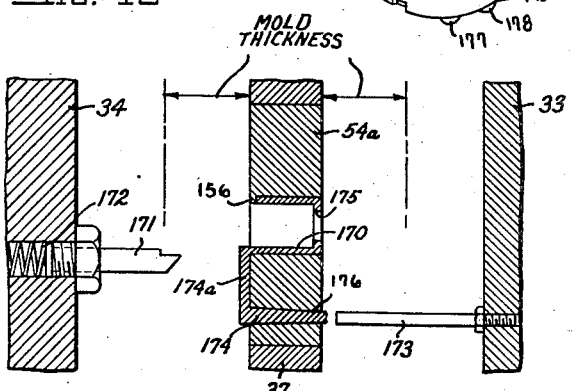
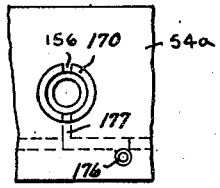
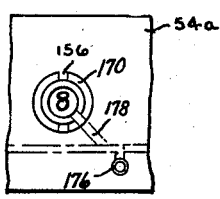
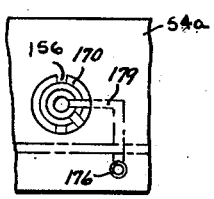
INVENTOR
WARREN R. TUCKER
BY
ATTORNEYS

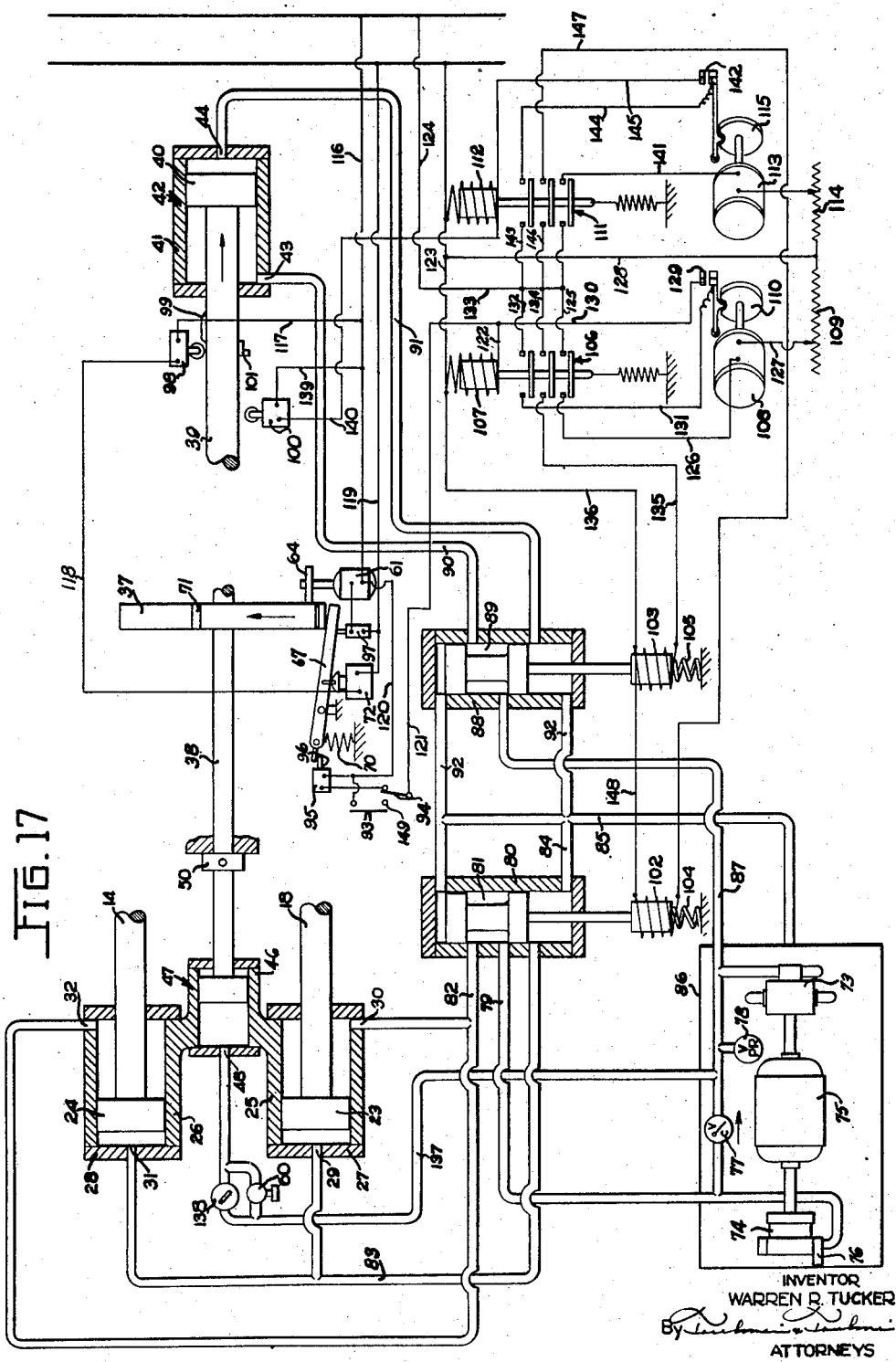

Patented Oct. 26, 1943

2,333,059

UNITED STATES PATENT OFFICE 2,333,059

TWO COLOR INJECTION DIE

Warren R. Tucker, Dayton, Ohio, assignor to The Hydraulic Development Corp. Inc., Wilmington, Del., a corporation of Delaware Application January 8, 1941, Serial No. 373,650

15 Claims. (Cl. 18—30)

This invention relates to plastic injection apparatus for producing plastic articles from a plurality of different plastics which may be either of different characteristics or of different colors.

An object of the invention is to provide an apparatus for producing a composite plastic article from a plurality of plastics by a continuous process.

Another object of the invention is to inject plastic material into a forming die by subsequent steps to form a composite plastic article from a plurality of plastics.

It is another object of the invention to provide an apparatus according to the foregoing object wherein the injections of plastic into the forming die are used as a part of the die member for subsequent injections.

It is another object of the invention to provide a plastic injection machine capable of injecting two or more plastics into a common mold cavity to form a composite plastic article.

It is another object of the invention to provide a machine in accordance with the foregoing object wherein the various steps of injection of plastic material into the mold are carried out in a regular order in a continuous process.

It is another object of the invention to provide a plastic injection machine for producing plastic articles from a plurality of plastic materials wherein a common sprue opening can be used for all of the injections of plastic material.

It is still another object of the invention to provide a plastic injection machine wherein the forming molds are carried by a turret for successive advancement into operative relation with various plastic injection stations whereby plastics of different characteristics or colors can be injected into the mold cavity in successive steps to produce a composite article.

It is another object of the invention to provide a plastic injection machine for producing composite plastic articles wherein the sprues and runners are ejected from the mold after each injection and the work piece is retained within the mold so that further work can be accomplished upon the same.

It is another object of the invention to provide a plastic injection machine for producing composite articles wherein the work piece is retained in a mold through a succession of operations.

It is another object of the invention to eject a work piece and the sprue and runners in opposite directions from the mold.

It is another object of the invention to provide a completely automatic plastic injection machine for producing plastic articles from a multiplicity of plastics in a continuous process.

It is another object of the invention to provide a method for producing composite plastic articles from a plurality of plastic materials by a succession of injection operations into a common mold cavity.

It is still another object of the invention to provide a method of producing composite plastic articles by utilizing the material injected into the mold as a part of the mold for subsequent injection operations.

It is another object of the invention to provide an apparatus for removing the sprue and runners from a mold in which plastic material has been injected after the injection operation and retaining the work piece in the mold to permit the sprue and runners to be used again for a subsequent injection of plastic material.

Further objects and advantages will be apparent from the drawings and from the following description.

In the drawings:

Figure 1 is a plan view, partially in cross-section and partially in elevation, of a plastic injection machine for practicing the purposes of this invention, the machine being shown in the injecting position.

Figure 2 is a plan view similar to Figure 1 but shows the machine in the idle position.

Figure 3 is a side elevational view of the machine disclosed in Figure 1.

Figure 4 is a cross-sectional view taken along line 4—4 of Figure 3.

Figure 5 is a horizontal cross-sectional view of the mold taken along line 5—5 of Figure 4, showing the injection of a plastic material.

Figure 6 is a horizontal cross-sectional view of the mold taken along line 6—6 of Figure 4, showing the injection of a second plastic into the same mold.

Figure 7 is a vertical cross-sectional view of the mold taken along line 7—7 of Figure 4.

Figure 8 is a cross-sectional view showing the mechanism for ejecting the work piece and the sprue and runners in opposite directions from the mold.

Figure 9 is a cross-sectional view taken along line 9—9 of Figure 8.

Figure 10 is a perspective view of a work piece produced from two different plastics.

Figure 11 is a perspective view of a work piece produced from three different plastics.

Figure 12 is a perspective view of the bottom edge of the work piece disclosed in Figure 11 showing the manner of arranging the gates around the work piece.

Figures 13, 14 and 15 are plan views of a mold showing the manner in which the runners and gates can be arranged for injecting a plurality of plastics into a common mold from a common sprue.

Figure 16 is a cross-sectional view of a portion of the mechanism of the plastic injection machine, showing the manner in which the sprue and runner can be ejected from the mold without removing the work piece.

Figure 17 is a diagrammatic system view of the hydraulic and electric controls for complete automatic operation of the injection machine of this invention.

In this invention the plastic injection machine consists of a bed 10 upon which there is stationarily mounted the upright 11 at one end of the bed 10, and the uprights 12 and 13 at the opposite end thereof. Strain rods 14 extend between the uprights 11 and 13 and are arranged to space the uprights 11 and 13 with respect each other. Suitable bolts 15 secure the strain rods 14 to the uprights 11 and 13. The strain rods 14 extend through the stationary uprights 12 for providing additional support for the same.

The upright 12 carries a plurality of injection cylinders 16 and 17, in which the injection plungers 18 and 19 operate. As disclosed in the drawings there is shown only two injection cylinders. However, as the description of the machine proceeds it will become apparent that the number of injection cylinders used on the machine is limited only by the space within a given diameter of the machine. It will be hereinafter shown the manner in which any number of injection cylinders can cooperate with the dies or mold for injecting any number of different plastic materials into a common mold cavity by successive injection operations. The injection cylinders 16 and 17 are heated in any well known manner for plasticizing the plastic material fed into the cylinders. The heating means can be either electric, steam, or any other well known heating device, such heating apparatus for injection cylinders being well known in the art and is not therefore particularly disclosed and will not be described with regard any particular heating means.

Each of the injection cylinders 16 and 17 is provided with a means for feeding plastic material into the same. Each of the feeding apparatus is arranged to feed a different material into its respective injection cylinder so that each injection cylinder is fed with a different plastic material from its own source of supply. This feeding means consists of a hopper 19 which is suitably mounted upon the injection cylinder and which is arranged to contain the plastic material to be fed into the cylinder. A feed screw 20 is arranged within the feeding chamber of the hopper 19 for advancing material through the feeding chamber into the inlet opening 21 of the injection cylinder. A suitable electric motor 22 is provided for rotating the feed screw 20 whereby the plastic material will be advanced into the injection cylinder each time the motor 22 is caused to function.

Suitable electric control of the operation of the motor 22 is provided for automatically controlling the quantity of plastic material fed into the injection cylinder in accordance with the quantity of material ejected from the cylinder, such controls being well known in the art and of which the control system disclosed in the patent to Lawyer, No. 2,159,559, is a typical example. As heretofore mentioned each of the injection cylinders 16 and 17, and any other injection cylinders positioned on the machine, are provided with the feeding mechanism heretofore described.

The injection plungers 18 and 19 are connected to the pistons 23 and 24 respectively which operate within the cylinders 25 and 26 respectively. The association of pistons and the cylinders provide hydraulic motors 27 and 28 respectively which are adapted to reciprocate the plungers 18 and 19 within the cylinders 16 and 17 respectively for ejecting plastic material therefrom during a certain portion of the cycle of operation of the plastic injection machine. The hydraulic motor 27 is provided with fluid connections 29 and 30 arranged at opposite ends of the cylinder 25 for admission of fluid to the cylinder 25 and the exhaust and fluid therefrom. Similar connections 31 and 32 are provided on the cylinder 26 for the hydraulic motor 28. Suitable controls hereinafter described are provided for controlling the admission of the hydraulic fluid to the respective fluid connections for reciprocating the pistons 23 and 24 within their respective hydraulic motors.

Bolsters 33 and 34 are carried upon the strain rods 14 in a manner that they can slide longitudinally thereupon. The bolster 33 carries a die closure plate 35 while the bolster 34 carries a die closure plate 36. A turret 37 is arranged between the die closure plates 35 and 36 and is rotatably supported upon the shaft 38.

The bolster 34 is connected to the ram 39, which ram has an enlarged head to form a piston 40 which is arranged for reciprocation within a cylinder 41 thereby providing a hydraulic motor 42. Suitable fluid connections 43 and 44 are provided for the cylinder 41 at opposite ends thereof for reciprocating the piston 40 therein, whereby the ram 39 is reciprocated for closing and clamping the end closure plates 35 and 36 in a manner which will be hereinafter described.

The turret 37, as previously mentioned, is carried upon the rod 38 the turret being both rotatable and slidable upon the shaft 38. The shaft 38 extends through the stationary upright 12, the bolsters 33 and 34 and into the ram 39. One end of the rod 38 is provided with a piston head 45 which is associated with a cylinder 46 and is arranged for reciprocation therein, whereby a hydraulic motor 47 is provided for reciprocating the rod 38 for purposes which will be hereinafter described. A fluid connection 48 is provided in one end of the cylinder 46 for establishing pressure in the chamber 49. Stop collars 50, 51 and 52 are secured upon the rod 38 in such a manner that they cooperate with the upright 12, the bolster 33 and the turret 37 to control movements of the rod 38, the bolster 33 and the turret 37. A spring 53 is positioned between the turret 37 and the bolster 33 for urging the turret 37 away from the bolster 33 when the end closure plates 35 and 36 are separated by the hydraulic motor 42.

The turret 37 in cooperation with the die closure plates 35 and 36 provides a mold in which plastic material can be injected. Preferably the turret is provided with die inserts which may be suitably secured within the turret 37 by means of the bolts or screws 55. The die inserts 54 are provided with suitable cavities which form the configuration of the article to be formed therein. The die closure plates 35 and 36 are provided with core members 56 which cooperate with the die cavities 57 in the die inserts 54 for producing a cavity of a suitable shape within which plastic material can be injected to form an article of predetermined configuration. It is thus seen that the mold for producing the plastic article consists of three elements rather than the usual two. The die closure plates 35 and 36 are stationary with respect the turret 37, the turret being rotated between the die closure plates in a manner to advance the mold cavity adjacent the injection cylinders 16 and 17 upon subsequent operations of the injection machine.

The mechanism of the machine heretofore described is arranged for closing the molds, advancing the molds into engagement with the injection nozzles of the injection cylinders, of applying clamping pressure upon the molds and of injecting material into the molds. This cycle of operation will be understood by those versed in the plastic injection art but will be described with particularity with regard the machine of this invention. Referring to Figure 2, the machine is shown in the idle position. In order to place the machine in condition for injection of plastic material into the die cavities 57 hydraulic fluid is admitted through the fluid connection 44 in the motor 42 whereby the piston 40 is forced forwardly. Forward movement of the piston 40 carries the ram 39 and the bolster plate 34 forward until it engages the turret 37. Continued forward advancement of the ram 39 causes the turret 37 to compress the spring 53 to permit engagement of the turret 37 with the die closure plate 35, whereby the bolster 33 is moved toward the injection cylinders 16 and 17 to cause engagement of the injection nozzles 58 and 59 respectively with the die closure plate 35.

In order to relieve the force of engagement of the die closure plate 35 upon the injection nozzles 58 and 59, hydraulic fluid has been admitted to the motor 47 through the fluid connection 48 which has a choke valve 60, see Figure 17, positioned therein to retard the outward flow of fluid from the chamber 49. Compression of the fluid in the chamber 49 will thus absorb or cushion the engagement of the die closure plate 35 upon the injection nozzles 58 and 59.

After the ram 39 has closed the mold and engaged the same with the injection nozzles, hydraulic fluid is admitted to the motors 27 and 28 through the connections 29 and 31. The pistons 23 and 24 are then forced forwardly carrying the injection plungers 18 and 19 through an injection stroke within the cylinders 16 and 17. Plastic material is thereby forced through the nozzles 58 and 59 into the die cavities 57. As disclosed in the drawings both of the injection plungers 18 and 19 operate substantially simultaneously so that the injection of the plastic materials retained within the various injection cylinders will occur through the same time interval of the cycle of operation of the machine.

At this point in the cycle of the operation of the machine, the position of the various apparatus is as disclosed in Figure 1. After a suitable dwell period for permitting the plastic material in the various molds to set, the injection plungers 18 and 19 are retracted from the cylinders 16 and 17 by the admission of fluid to the motors 27 and 28 through the fluid connections 30 and 32 respectively. Upon reciprocation of the plungers 18 and 19 the mechanism for feeding plastic material from the hopper 19 is set in motion and is operated for a predetermined time interval to feed a determined quantity of material into the injection cylinder, such operation being heretofore referred to and is described in detail in the aforementioned Lawyer patent.

When the plungers are on their retraction stroke the ram 39 can be retracted by the motor 42 since hydraulic fluid will now be admitted to the motor 42 through the fluid connection 43. As the ram 39 moves in a rightward direction, see Figure 1, the bolsters 33 and 34, with the mold, comprising the end closure plates 35, 36 and the turret 37, will move as a unit to disengage the end closure plate 35 from the injection nozzles 58 and 59, such movement being caused by pressure within the chamber 49 of the motor 47. The bolster 33 and the cooperating mechanism will be moved in a rightward direction until the stop collar 50 strikes the upright 12, at which time the bolster 33 will stop. However, the ram 39 continues its retraction motion thereby removing the die closure plate 36 away from the die closure plate 35. In this motion the spring 53 will move the turret 37 away from the end closure plate 35 until the turret 37 strikes the stop collar 52. The ram 39 still continues its retraction motion until the piston 40 bottoms in the cylinder 41, whereby the apparatus will now be positioned as disclosed in Figure 2 and is again ready for a subsequent injection cycle after the turret 37 has been indexed in order to present the mold which was in operative alignment with the injection cylinder 16 into operative alignment with the injection cylinder 17.

The indexing mechanism for the turret 37 consists of an electric motor 61 carried upon an arm 62 which is pivoted at 63 upon the base 10. A friction wheel 64 is carried by the shaft of the electric motor 61 and is arranged to engage the turret 37 to rotate the same by frictional engagement therewith. The motor 61 is carried on the arm 62 on one side of the pivot 63 so that the weight of the motor causes frictional engagement of the friction wheel 64 against the turret 37. This frictional engagement can be aided by a spring 65. A stop member 66 is provided adjacent the motor 61 to prevent the same from pivoting too far in a forward direction when the turret 37 is retracted to the position disclosed in Figure 2.

A turret lock is provided for securing the same in an indexed position and consists of a locking arm 67 which is pivoted at 68 upon an upright 69, and is urged in an upward direction about the pivot 68 by means of a spring 70, whereby the arm 67 will engage the locking slots 71 provided in the turret 37 upon the slots aligning with the arm 67. To release the arm 67 from the locking slots 71 an electric solenoid 72 is provided which is suitably connected to the arm 67. Energization of the solenoid 72 will cause the arm 67 to be disengaged from the slot 71 thereby releasing the turret 37 to permit rotation thereof by the electric motor 61.

The hydraulic system and the electrical controls for the injection machine, and the automatic operation thereof will now be described. The hydraulic system for operating the injection machine consists of a variable delivery high pressure pump 73, and a constant delivery low pressure pump 74 which are connected to a common electric motor 75. The variable delivery pump 73 is provided with conventional control mechanism for controlling the maximum pressure of delivery from the pump, which high pressure of delivery is used for clamping the molds during the injection cycle of the machine. The controls for regulating such a variable delivery pump are well known, and the pump need not be of any particular variety and therefore further description of the exact pump nature is not believed necessary. The low pressure constant delivery pump 74 is provided with a relief valve 76, which valve is provided to permit by-passing of the output of the pump 74 when the pressure in the system is above the maximum delivery pressure of the constant delivery pump. A check valve 77 is provided in the common discharge line between the pumps 74 and 73 to prevent the high pressure of the pump 73 from reacting upon the pump 74 during certain portions of the cycle of operation of the injection machine. A safety pressure relief valve 78 is provided in the discharge conduit from the pump 73 to prevent development of undue pressures should the control mechanism of the variable delivery pump fail to function.

The constant delivery pump 74 discharges into a conduit 79 which connects with the central chamber of a four-way valve 80. The central chamber 81 of the four-way valve 80 is provided with a conduit 82 which connects with the fluid connections 30 and 32 of the hydraulic motors 27 and 28 respectively. As shown in Figure 17, hydraulic fluid is now present in the motors 27 and 28 to cause retraction of the pistons 23 and 24 respectively. Fluid from the left-hand end of the motors 27 and 28 has been discharged through the fluid connections 29 and 31 respectively into the conduit 83 which is connected to the four-way valve 80 and thus to the return conduit 84 which communicates with a conduit 85 in communication with a fluid storage tank 86. The variable delivery high pressure pump 73 discharges into a conduit 87 which connects with the central chamber of a four-way valve 88. As shown in Figure 17 the central chamber 89 of the four-way valve 88 is connected by means of a conduit 90 with the fluid connection 43 of the hydraulic motor 42, whereby the motor is being retracted by the admission of fluid thereto. The fluid in the right-hand end of the hydraulic motor 42 is discharged through the fluid connection 44 into a conduit 91 which is also connected with the valve 88 for directing the flow of fluid through the conduit 92 to the fluid return conduit 85 of the storage tank 86. When the valves 80 and 88 are shifted to their opposite positions from that shown in Figure 17 the conduit 92 communicates with the conduits 82 and 90 respectively for return flow of hydraulic fluid from the hydraulic motors 27, 28 and 42, fluid under pressure then being admitted through the conduits 91 and 83 for forward advancement of the pistons 23, 24 and 40 within the respective motors.

The electric circuit for the injection machine consists of a manually operated push button switch 93. A selector switch 94 is provided for establishing whether the machine shall operate completely automatically or whether the machine shall operate through one cycle of operation and then stop, subsequent operations being manually started by operation of the push button switch 93. An electric switch 95 is operated by means of the arm 67 of the indexing mechanism for the turret 37. This switch is of a type which is normally open and will be closed only upon a downward movement of the lever 96. The switch 95 is so arranged that when the arm 67 strikes the lever 96 tending to move the same in an upward direction the switch 95 will not close circuit therethrough. A normally open switch 97 is in operative association with the arm 67 of the indexing mechanism and is adapted to be closed when the arm 67 engages the same.

A normally open switch 98 is associated with the ram 39 and is adapted to be closed by a projection 99 extending from the ram 39 only when the projection strikes the operating lever of the switch 98 moving in a right-hand direction. This switch 98 controls the initiation of an indexing cycle which will be hereinatfer described.

A normally open electric switch 100 is also associated with the ram 39 and is adapted to be closed momentarily when the projection 101 strikes the operating lever thereof when moving in a leftward direction. The switch 100 is arranged to prevent the closure of electric circuit when the operating lever is carried in a rightward direction. This switch is associated with the ram in such a manner that it is tripped at the proper position of mold closing to initiate operation of the injection plunger as will be hereinafter described. The four-way valves 80 and 88 are electrically controlled by means of the solenoids 102 and 103 respectively, the springs 104 and 105 urging the valves 80 and 88 respectively into their positions as shown in Figure 17.

An electric relay 106 having an operating solenoid 107 controls the current to a timing motor 108. The timing motor 108 is provided with a rheostat 109 in the electric circuit thereof to control the speed of operation and thus control the duration of the time interval for rotation of the cam 110. This mechanism controls the timing cycle for the mold closing apparatus.

An electric relay 111 operated by a solenoid 112 controls the electric circuit to a timing motor. The timing motor 113 is provided with a rheostat 114 in the electric circuit thereof for controlling the operation of the motor and thus the time interval for rotating the cam 115. This mechanism controls the timing cycle of the injection plungers 18 and 19.

Referring to Figure 17, the cycle of operation of the machine is as follows. The position of the elements of the control system and the elements of the machine are such that the injection plungers 18 and 19 have been retracted from their respective cylinders 16 and 17. The ram 39 is retracted so that the die closure plates 35 and 36 are in the open position as shown in Figure 2, and the turret 37 is released, as disclosed in Figure 2. Upon retraction of the ram 39 the projection 99 thereon engages the switch 98 to close circuit therethrough by means of the electric lines 116, 117 and 118 to the solenoid 72, the return circuit being through the line 119. The solenoid 72 is thus energized retracting the arm 67 from within the slot 71 of the turret 37. When the arm 67 is retracted the electric switch 97 is engaged thereby, whereby circuit is completed to the electric motor 61 through the line 116, the electric switch 97 and the return line 119. The electric motor is now driving the turret 37 to index the same to the next position, or until the arm 67 engages the next successive slot 71. Indexing of the turret 71 positions the mold cavities 57 in their proper positions with respect the injection nozzles 58 and 59 for subsequent injection operations, which operations will be hereinafter described.

When the turret 37 has been rotated a sufficient distance, or a quarter turn, as indicated by the disclosure of this invention, the arm 67 will engage the slot 71, being forced into the slot by the tension spring 70. Downward movement of the arm 67 causes the end thereof to engage the operating lever of the switch 95, whereby electric circuit is momentarily made through the lines 116 and 120 to the switch 95, through the switch 95, the line 121, 122 to the solenoid 107, return circuit being made through the line 123. Momentary closure of this circuit energized the solenoid 107 to close the relay 106.

When the relay 106 is closed electric circuit is made for the timing motor 108 through the lines 124, 125 and 126, the return circuit being through the line 127, the rheostate 109 and the line 128. The electric motor 108 is thus initiated in operation whereby the cam 110 rotates to close the contacts 129 thereby establishing a holding circuit for the solenoid 107 through the line 123, the solenoid 107, the lines 122 and 130, the contacts 129 and the lines 131, 132 and 133. The timing motor 108 is adapted to revolve the cam 110 one full revolution to maintain the solenoid 103 energized through a circuit established through the lines 133, 134 and 135 to the solenoid 103, the return circuit being through the lines 136 and 123. Energization of the solenoid 103 shifts the four-way valve 88 to a position whereby hydraulic fluid is delivered through the lines 87 and 91 to the right-hand end of the hydraulic motor 42. A return circuit for hydraulic fluid is now established through the lines 90, 92 and 85.

The forward advancement of the ram 39 is only lightly resisted during the first part of its movement so that the full volume of the low pressure pump 74 and of the high pressure pump 73 is delivered to the hydraulic motor 42. The ram 39 first causes the die closure plate 36 to engage the turret 37 and advance the same into engagement with the die closure plate 35. Continued advancement of the ram 39 advances the bolster 33 into engagement with the injection nozzles 58 and 59. During the time the ram 39 is moving forwardly fluid pressure is established in the conduit 137, through the check valve 138 to the hydraulic motor 47.

The fluid pressure in the hydraulic motor 47 retains the turrent 37 and the bolster 33 in the positions as shown in Figure 1. As soon as the ram 39 engages the turret 37 tending to close the same against the die closure plate 35, the fluid within the motor 47 will be forced out of the motor 47 through the choke valve 60, the check valve 138 being closed against return flow of fluid. A resistance is thus established to prevent the ram 39 from forcibly engaging the bolster 33 with the injection nozzles 58 and 59. Once the nozzles are engaged the position of the elements is as disclosed in Figure 1, whereby the variable delivery high pressure pump 73 increases the fluid pressure in the motor 42 to its maximum pressure to establish the desired mold closing pressure. The check valve 77 is closed at this time by the high pressure fluid acting thereon.

As the ram 39 moves forwardly the projection 101 secured thereon trips the electric switch 100 near the end of the mold clamping stroke whereby electric circuit is established to the solenoid 112 through the lines 116 and 139 to the switch 100, through the line 140 to the solenond 112, the line 123 establishing the return circuit. The momentary tripping of the switch 100 energizes the solenoid 112 to close the relay 111 to establish electric circuit to the timing motor 113 by means of the electric circuit through the lines 133 and 141 to the motor 113 through the return circuit made by the rheostat 114 and the lines 128 and 123. The timing motor 113 thus starts to rotate the cam 115 whereby the contacts 142 are closed establishing a holding circuit for the relay 111 through the lines 124, 133, 143 and 144 to the contacts 142 and a return circuit through the line 145, the solenoid 112 and the line 123. The closing of the relay 111 by the solenoid 112 also establishes a circuit through the lines 124, 146 and 147 to the solenoid 102 and a return circuit through the lines 148, 136 and 123.

Since the hydraulic motor 42 has now clamped the molds in their closed position against the injection nozzles it can be seen that the machine is ready for the injection stroke. The energization of the solenoid 102 shifts the four-way valve 80 to establish fluid pressure within the lines 79 and 83 to the left-hand end of the hydraulic motors 27 and 28, the return fluid circuit being established through the lines 82 and 85. The constant delivery pump 74 will thus advance the injection plungers 18 and 19 to eject plastic material from the injection cylinders 16 and 17, the ejection from the cylinders being substantially simultaneous.

The timing motors 108 and 113 are suitably controlled through the rheostats 109 and 114 to determine the interval of time through which the cycle is operated, the timing motor 113 thus establishing the period of forward advancement of the plungers 18 and 19 and the dwell period thereof, while the motor 108 controls the period through which the molds will be clamped.

After the predetermined dwell period of the injection plungers 18 and 19, as established by the timing motor 113, electric circuit through the contacts 142 is broken thereby deenergizing the solenoid 102 and permitting the spring 104 to shift the valve 80 to the position as shown in Figure 17. The positioning of the valve in this manner re-establishes the hydraulic circuit as disclosed in Figure 17 for retracting the plungers 18 and 19 from the injection cylinders 16 and 17. As the plungers 18 and 19 are retracted, the motor 22 for feeding plastic material into the injection cylinders is started by a suitable control and is automatically controlled in its time cycle to feed a determined quantity of plastic material into the injection cylinders, which controls have heretofore been mentioned as old in the art and which are commonly used for determining the quantity of granular plastic material fed into the injection cylinders. Upon initiation of retraction of the injection plungers 18 and 19 the timing motor 108 completes its timing cycle so that the electric circuit established through the contacts 129 is now broken to deenergize the solenoid 107 and thus the solenoid 103 since the relay 106 will now be open.

Deenergization of the solenoid 103 establishes hydraulic circuit as disclosed in Figure 17 through the valve 88 to cause retraction of the ram 39. Retraction of the ram 39 produces the sequence of events of retracting the bolster 33, the die closure plates 35 and 36 and the turret 37 as a unit from the injection nozzles 58 and 59, spacing of the turret 37 from the die closure plate 35 and causes removal of the die closure plate 36 from the turret 37 as heretofore described. The turret is now released and can be indexed to index the molds a quarter turn. Upon retraction of the ram 39 the electric switch 98 is again closed to establish circuit to the solenoid 72 and initiate the cycle as heretofore described.

The plastic injection machine can either be operated on a full automatic cycle or upon a single cycle of operation as determined by the position of the hand switch 94. When the switch 94 is in the position, as shown in Figure 17, the injection machine will perform on a completely automatic cycle of operation. When the switch 94 is shifted to engage the contact 149 the automatic cycle of operation of the machine will be interrupted after the indexing of the turret 37 since the closure of the switch 95 will now be ineffective to energize the solenoid 107 until the push button switch 93 is manually operated.

The plastic injection machine as heretofore described, and the cycle of operation for the same is particularly adaptable to the injection molding of articles from a plurality of plastic materials for producing composite articles in a continuous process by a plurality of injections into a common mold cavity. It is of course understood that each of the injection cyclinders 16 and 17 are fed by separate feeding mechanisms, each cylinder ejecting a plastic having a different composition or a different color. Since the injection plungers 18 and 19 operate in parallel it can be seen that the machine will inject all of the various plastic materials into their respective mold cavities at the same time and that the turret 37 can be suitably indexed to bring the mold cavity from one injection cylinder to the other for subsequent injections of plastic material.

As heretofore described the mold in which the plastic article is to be produced consists of the die closure plates 35 and 36, one of which is mounted upon the bolster 35 and the other of which is mounted upon the bolster 34. The turret 37 is provided with die inserts 54 which cooperate with the die closure plates 35 and 36 to form a complete mold into which plastic material can be injected.

As disclosed in the drawings of Figures 1 to 10 inclusive, the machine is adapted to manufacture a two-color article such as disclosed in Figure 10 wherein the article 150 consists of a body having a numeral inserted in the top thereof which is of a different color or of a different plastic than the main portion of the body. The apparatus of Figures 1 to 10 discloses the machine as set up for producing this particular article 150.

To produce the article 150 the die inserts 54 are provided with a plurality of circular openings 151 which will form the outer dimension for the button or key 150. A sprue opening 152 is provided in the die insert 54 which communicates with a tapered opening in the die closure plate 35. The tapered opening 153 provides the seat for the injection nozzles 58 and 59 when the die closure plate is brought into engagement with the respective nozzles.

The die closure plate 36 is provided with a core member 56 which is of slightly smaller size than the circular openings 151 in the die inserts 54 thereby establishing a cavity into which plastic material can be injected. The core member 56 is provided with an upwardly extending projection 154 which engages the die closure plate 35 when the elements are in position for injection molding. This projection 154 is according to the disclosure of this invention arranged in the shape of a numeral which can be the numeral eight as disclosed in Figure 10. The die closure plate 36 is also provided with a plurality of grooves 155 which provide the runners and gates for the mold cavity. The turret 37 is provided with a plurality of the die inserts 54, each of which is alike, and which will be indexed adjacent the injection molding stations A and B respectively, see Figure 4. In the cycle of operation of producing the article 150, station A is the first injection of plastic material into the mold cavity while station B is the second injection of material into the mold cavity. The station C can be an injection station for plastic material as will be hereinafter described, or can be a station for ejecting the sprue and runners injected in the station A. The station D is the ejecting station for the completed work piece.

The assembled elements of the mold, as disclosed in Figure 5, are the elements as they will be positioned in the injection station A for the first injection of plastic material into the mold cavity produced by the assembly of elements and the core member 56. The injection machine is placed through its injection cycle for injecting plastic material into the mold cavity 57 whereby the mold will appear as disclosed in Figure 5 with the cavity 57 filled with material.

After the injection operation the die closure plate 36 will be retracted from the turret and the die closure plate 35, thus withdrawing the core 56 from within the die cavity 57. The removal of the core 56 would, under normal circumstances, have a tendency to remove the article molded in the cavity 57. However, this removal is prevented since a small lip 156 is provided in the edge of the circular opening 151 which engages the plastic material in the cavity 57 thereby preventing the plastic article from being forcibly removed from the mold cavity when the core member 56 is pulled from the mold by movement of the bolster 36.

The injection machine will then index the turret to the station C, at which station the injected article can have further work performed thereon, such as a subsequent injection or an ejection of the sprue and runners, which operations and the purposes of the same will be hereinafter described. However, for the purposes of manufacturing the two-color button or key 150 the station C need not be used.

The next indexing of the turret 37 will bring the article which was injected in the station A into the station B. As will be seen in Figure 4, the injection nozzles 58 and 59 are not arranged on the center line of the die but rather are off center so that the sprue opening and runners which were injected in the station A will assume the position indicated at 157 when the mold has been indexed to this point. This arrangement permits one plastic material to be injected in one side of the die cavity 57, while the second material can be injected from the opposite side without requiring the runners of the new material from engaging the runners previously injected, it being understood that the sprue and the runners are in the die closure plate 36a which is associated with the injection station B.

The injection station B has a die closure plate 35a which is similar to the die closure plate 35, wherein the tapered opening 158 is provided for seating the nozzle 59. The die closure plate 36a, which is associated with station B, is provided with the runners 159 through which the second plastic material will be injected, these runners cooperate with the sprue opening 160 which has previously been provided in the die insert 54 for cooperation with the runners 159 when in the injection station B, but is inactive when in the injection station A. The die closure plate 36a is also provided with suitable grooves 161 for receiving the runners which have been injected at the station A. A core 162 extends from the die closure plate 36a and is of smaller diameter than the cavity provided within the molded work piece as presented in station B, whereby a mold cavity is formed between the core 162 and the work piece 150. It will thus be seen that the work piece 150, as injected at the station A, forms a part of the mold cavity at the station B, the changing of the core members altering the configuration of the die cavity to an extent that a second plastic material can be injected into the article as formed in the first injection station to produce a composite article from a plurality of plastic materials.

After the machine has closed the dies and clamped the same the injection operation as heretofore described is completed, whereby plastic material is injected through the sprue opening 160, the runners 159 and into the newly formed mold cavity. Since the core member 162 is not provided with the same projections 154 as the core member 156 it can be seen that the plastic material injected in the die cavity provided in the injection station B will fill the openings previously provided in the injection station A so that the numeral eight, as disclosed in Figure 10, will appear upon the surface of the button key 150.

As previously mentioned the molded article 150 is retained within the circular opening 151 of the die insert 154 by means of the lip 156. Thus it will be seen that with the lip 156 extending into the molded article that the same will be locked in the die insert 54 by means of the runners formed when the article was injection molded. It will thus be apparent that the article cannot be ejected from the mold in the common manner of merely inserting ejecting pins at proper locations for ejecting the molded article, the runners, sprues and gates as a unit piece. In this invention therefore means are provided for clipping the gates of the molded article and for ejecting the molded article in a direction opposite from that which the sprue and runners will be ejected. This mechanism is disclosed in Figures 8 and 9.

The clamping bolster 34 is provided with a plurality of ejecting pins which are suitably secured thereto and which are associated with the station D, as indicated in Figure 4, station D being the ejecting station for the work piece and for clearing the molds. The bolster 33 is also provided with a plurality of ejecting pins 164, which ejecting pins are positioned in a manner to engage the sprues 152a and 160a. The face 165 of the ejecting pin 163 provides an edge around the periphery thereof which engages the runners 159 and 155 in a manner to cut the runners from the work piece 150. The pins 163 can then eject the work piece 150 from the circular opening 151 of the die inserts 54 in the direction toward the bolster 33 while the epecting pins 164 eject the sprues 160a and 152a with the runners 159a and 155a respectively in the direction of the bolster 34. The ejecting pins 163 have a groove 166 in the edge thereof arranged to pass over the lip 156 provided in the inserts 54 whereby the ejecting pins can pass through the insert 54.

The ejecting operation takes place at station D, see Figure 4, upon the closing or clamping motion of the die closure plates 35 and 36 by means of the bolsters 33 and 34 respectively. It is thus seen that this invention provides means for locking the work piece in place in the die inserts for removal and insertion of various core members to form die cavities of different configuration so that the work piece can be progressively indexed adjacent successive injection stations to produce a composite plastic article from a plurality of plastic materials, the work piece remaining with the mold through the entire process of the several injection operations.

While the apparatus as heretofore described has been directed to the manufacture of a two-color plastic article, or an article made from two different plastics, the machine and the process is just as applicable to the injection of any number of plastic materials. It is required that but slight modification be made of the apparatus in order to inject any number of materials by subsequent injection steps into a common mold cavity.

In order to utilize the machine as disclosed in Figures 1 to 10 inclusive for the injection of more than two plastic materials it is only required that a third injection cylinder be stationed adjacent the station C, see Figure 4, and position the injection nozzle in such a manner that the sprue entering the mold will not interfere with the sprues of the stations A and B. The runners and gates for the mold can very easily run under or over the runners previously injected without danger of mixing either plastics of different composition or of different color. It is thus seen that in order to inject more than two colors it becomes a matter of mold and runner design for the various mold cavities rather than any specific alteration of the machine other than the addition of sufficient injection cylinders to take care of the number of different plastic materials which are to be injected.

In Figures 12 to 15 inclusive there is shown a modified arrangement for injection molding an article having three different colors, or it can be made from plastic materials having three different compositions. In the arrangement disclosed therein, the runners and the sprues are clipped and ejected after each injection operation so that the same sprue opening can be used for a subsequent injection operation, it being necessary only to change the gates and the runners but slightly in order to provide a second access opening into the mold cavity.

In this modification the molded article 170 consists of a body of one color having a numeral inserted in a circle of a third color. In the arrangement herein disclosed the die closure plates and the association thereof with the turret is the same as in the machine described in the general description. The functioning of the machine and the general method of inserting the core members into the dies for altering the configuration of the die cavity and the utilization of the previously injected plastic material as a part of the die is the same association of parts and functions as heretofore described. In the modified form of apparatus however the sprue and runners are adapted to be ejected from the mold immediately after the injection thereof. This operation can be performed simultaneous with opening of the dies after the injection operation, and before the turret is indexed, or can be arranged as a separate step between the injection stations. It will be understood by those versed in the art as to the manner in which such ejection mechanisms can be constructed for the aforementioned purpose. However, to disclose at least one apparatus whereby the above mentioned function can be performed, Figure 16 discloses the ejecting mechanisms as associated with the bolster 34 and the bolster 33. In the arrangement herein disclosed the clamp bolster 34 carries a cutting device 171 which is reciprocably mounted with respect to the bolster 34, and is spring loaded by means of a spring 172. The bolster 33 carries an ejecting pin 173 which is in proper alignment with the sprue 174.

It is to be understood that the molded article 170 has just passed through the first stage of injection in the station A wherein the preliminary shell for the molded article 170 has been injection molded. A suitable core was inserted therein in order to permit the top opening 175 to remain unfilled until a subsequent injection operation. Upon the movement of the bolster 34 toward the turret 37 of the cutting device 171 strikes the runner 174a thereby severing the same from the body of the molded article 170. Immediately after severance of the runner 174a the ejector pin 173 strikes the sprue 174 and ejects the runner from the mold. The cutter 171 retracts into the bolster 34 when the same closes upon the turret 37 to clamp against the bolster 33. While the operation has been heretofore set forth as an independent operation which is performed between injection stations, since the ejecting of the sprue occurs simultaneously with mold closing, it will be readily understood by those versed in the art that the mechanical arrangement of the ejecting mechanisms can be such as to produce the ejection upon the mold opening operation and thus perform the sprue ejection immediately after the injection operation.

Since the sprue and runners has been ejected from the die insert 54a it can readily be seen that when the die insert is indexed by the turret 37 to the next injection station that the same sprue opening can be used as well as at least a portion of the runner. It is only required that new gates be provided to the newly formed mold cavity as provided by the proper association of core members with the molded article 170. As disclosed in Figures 13, 14 and 15, the sprue opening 176 remains in the same position with respect the mold cavity for the various injection operations. The only change required for permitting the second and third materials to enter the mold cavity is the alteration of the runners and the gate for the mold. The runner 177 of Figure 13 is arranged for the injection of the first plastic material, while the runner 178 shown in Figure 14 is provided with a new gate entrance into the mold cavity for the injection of the second material, and the runner 179 of Figure 15 is a new runner, yet it will be seen that the sprue opening 176 has remained in the same position.

The arrangement of the apparatus as disclosed in Figures 13 to 16 inclusive permits a much less complicated runner and gate arrangement when injecting more than two colors or two plastic materials since in a multiple mold the number of runners is of a considerable number, and if all of the runners and sprues are permitted to remain in the mold throughout the entire process of injection molding the composite article it can readily be seen that considerable complications will arise as to the positioning of the various sprues, runners and gates. Also, it can readily be seen that by the removal of the sprues and runners, as herein provided, the number of colors which can be injection molded into a common mold cavity is limited only by the number of gates which can be positioned around the mold cavity. Therefore, the apparatus is universal for injection molding any composite article from a plurality of plastics, it being required merely that the machine have sufficient injection cylinders carrying different materials or different colored materials for injection molding the desired number of materials.

While the form of the apparatus herein described constitutes a preferred form, yet it can readily be seen that various mechanical arrangements can be provided for performing the functions of my invention.

Having thus fully described my invention, what I claim as new and desire to secure by Letters Patent is:

1. An apparatus for injection molding multi-plastic articles comprising a mold having opposite open faces and chambers therein to form mold cavities, means engaging said mold faces to close said chambers and form a mold cavity, core means movable into and out of said mold, means for injecting plastic material in a cavity of said mold to form a semi-complete article having a runner extending therefrom, means in said mold for preventing movement of the semi-completed article in one direction in the mold when the mold is open for withdrawal of said core means, means in the mold in which the runner is formed when the semi-completed article is injection molded whereby the runner prevents movement of the semi-completed article in the opposite direction to thereby lock same in place, means for replacing said core means with other core means, and means for injecting other plastic material into said mold, whereby a composite article is formed.

2. An apparatus for producing plastic articles from a multiplicity of plastics which consists of a mold having core members defining a cavity, means for injecting plastic material into said cavity to fill a portion thereof, means for retaining the molded article in said mold, means for removing the sprues and runners from said mold, means for changing the core members within the molded article to alter the shape of the cavity therein, and means for injecting another plastic into said altered cavity through the cleared sprue and runners.

3. An apparatus for producing plastic articles from a multiplicity of plastics which consists of a mold having a sprue opening and a runner passage, core members movable into and out of said mold for defining a cavity, means for injecting plastic material into said cavity, means for opening said mold for withdrawing said core members, means for retaining the molded article in the mold, means for ejecting the sprue and runner from said mold, means for closing said mold and inserting new core members within the molded article to provide an altered die cavity in cooperation therewith, and means for injecting another plastic material into the altered die cavity through a cleared sprue and runner to form a composite article.

4. An apparatus for producing plastic articles by a multiplicity of injections into a die cavity which consists of a mold, means for injecting successive changes of plastic material into said mold, removable core members for said mold, means for changing the core members in said mold for altering the shape thereof subsequent to each injection and in a predetermined sequence, means for retaining the injected article within said mold during changes of said core members, and means for ejecting the completed plastic article and the sprues produced in molding from said mold in opposite directions.

5. A plastic injection machine for injection molding composite articles from a plurality of plastic materials comprising a turret, a plurality of molds carried by said turret, a pair of bolsters movable with respect to each other and with respect to said turret positioned adjacent opposite sides of said turret, power means connected to one of said bolsters for retracting the same from said turret, resilient means between said turret and the other of said bolsters to separate the same, a plurality of injection cylinders associated with said other of said bolsters, said power means moving said bolster carried thereby into engagement with said turret and compressing said resilient means to engage said turret with said other bolster to close said molds and advance the unit into engagement with said injection cylinders.

6. A plastic injection machine for injection molding composite articles from a plurality of plastic materials comprising a turret, a plurality of molds carried by said turret, a pair of bolsters movable with respect to each other and with respect to said turret positioned adjacent opposite sides of said turret, power means connected to one of said bolsters for retracting the same from said turret, resilient means between said turret and the other of said bolsters to separate the same, a plurality of injection cylinders associated with said other of said bolsters, said power means moving said bolster carried thereby into engagement with said turret and compressing said resilient means to engage said turret with said other bolster to close said molds and advance the unit into engagement with said injection cylinders, means for ejecting plastic material from said injection cylinder into said molds to form an article in said molds having a runner extending therefrom, means in said mold for preventing the movement of the article in one direction in the mold, said runner preventing movement of the article in the opposite direction to thereby lock same in place, and means for cushioning the engagement of said bolsters with the injection cylinders.

7. A plastic injection machine for injection molding composite articles from a plurality of plastic materials comprising a turret, a plurality of molds carried by said turret, a pair of bolsters movable with respect to each other and with respect to said turret positioned adjacent opposite sides of said turret, power means connected to one of said bolsters, resilient means interposed between said turret and the other of said bolsters for urging separation thereof, a plurality of injection cylinders associated with the other of said bolsters, said power means clamping said turret and molds between said bolsters and advancing the same as a unit into engagement with said injection cylinders, and means for cushioning the engagement of said bolsters with the injection cylinders, said cushioning means causing separation of said bolsters and said turret as a unit from said injection cylinders, said resilient means causing separation of said turret from said one bolster upon retraction of said other bolster by means of said power means.

8. A machine for producing composite plastic articles from a plurality of plastics injected into a common mold cavity by successive injections comprising a rotatable turret carrying a plurality of molds that are movable toward and away from an injection cylinder, a plurality of injection cylinders spaced from said turret and circumpositioned about the axis thereof, means for closing said molds, said last mentioned means also moving said closed molds into engagement with said injection cylinders, means for ejecting plastic material from said cylinders and into said molds, means for indexing said turret in one direction into successive positions adjacent said injection cylinders, and control means actuated by complete retraction of said mold closing and advancing means for initiating operation of said indexing means.

9. A machine for producing composite plastic articles form a plurality of plastics injected into a common mold cavity by successive injections comprising a rotatable turret carrying a plurality of molds that are movable toward and away from an injection cylinder, a plurality of injection cylinders spaced from said turret, means for closing said molds, said last mentioned means also advancing said closed molds into engagement with said injection cylinders, means for ejecting plastic material from said cylinders into said molds, means for indexing said turret, control means actuated by complete retraction of said mold closing and advancing means for iniating operation of said indexing means, control means actuated by said indexing means for initiating operation of said mold closing and advancing means, and a second control means actuated by said mold closing and advancing means for initiating operation of said injecting means.

10. A machine for producing composite plastic articles from a plurality of plastics injected into a common mold cavity by successive injections comprising a rotatable turret carrying a plurality of molds that are movable toward and away from an injection cylinder, a plurality of injection cylinders spaced from said turret, means for closing said molds, said last mentioned means also advancing said closed molds into engagement with said injection cylinders, control means for timing the cycle of operation of said mold closing and advancing means, means for ejecting plastic material from said cylinders into said molds, control means for timing the cycle of operation of said injecting means, means for indexing said turret, control means actuated by complete retraction of said mold closing and advancing means for initiating operation of said indexing means, control means actuated by said indexing means for initiating operation of said first mentioned timing control means, and a second control means actuated by said mold closing and advancing means for initiating operation of said second mentioned timing control means.

11. A mold adapted to be associated with a plastic injection machine for injecting composite articles by a plurality of successive injections of plastic material into a common mold cavity comprising a turret adapted to be associated with the aforesaid machine, inserts positioned in said turret, a mold cavity through each of said inserts, closure plates positioned adjacent opposite sides of said turret for closing said mold cavity, and a plurality of core means carried by said closure plates for successive association with each of said mold cavities when said turret is rotated in successive steps to successively alter the contour of each of said cavities and permit production of a composite article by successive injections of plastic material into the successive cavities formed by said core means.

12. A machine for injection molding a composite article from a plurality of plastic materials by injecting the materials into a common mold cavity comprising a plurality of molds carried by a turret, a plurality of injection cylinders, means for advancing said molds into successive engagement with said injection cylinders, means for cutting the runner from the molded article produced by each injection while in the mold, and means ejecting said runners and the sprue connected thereto before a subsequent injection into the common mold cavity.

13. A machine for injection molding a composite article from a plurality of plastic materials by injecting the materials into a common mold cavity comprising a plurality of molds carried by a turret, a plurality of injection cylinders, means to rotate said turret for advancing said molds continuously in one direction into successive engagement with said injection cylinders, means reciprocable into engagement with said molds for cutting the runner produced by each injection, means reciprocable in the opposite direction to said cutting means for ejecting said runners and sprue associated therewith prior to a successive injection, and means for retaining the injected article within said mold when ejecting the sprue and runners therefrom.

14. A method of injection molding composite plastic articles from a plurality of plastics by successive injection into a common mold cavity which consists of providing a mold cavity of a defined configuration, of inserting core members into said mold cavity for blocking off a portion thereof, of injecting plastic material into the mold cavity formed thereby, of clearing the sprue and runners for the cavity, of removing the core members and inserting other core members of different configuration to thereby produce a new mold cavity having a different configuration, and of injecting another plastic through the cleared sprue into the new mold cavity.

15. A method of injection molding composite plastic articles from a plurality of plastics by successive injection into a common mold cavity which consists of providing a mold cavity of a defined configuration, of inserting core members into said mold cavity for blocking off a portion thereof, of injecting plastic material into the mold cavity formed thereby, of removing the core members, of cutting the runners and ejecting the same with the sprue associated therewith, of inserting other core members of different configuration to thereby produce a new mold cavity having a different configuration, and of injecting another plastic through the same sprue into the new mold cavity.

WARREN R. TUCKER.